(12) United States Patent
Nam et al.

(10) Patent No.: US 8,106,884 B2
(45) Date of Patent: Jan. 31, 2012

(54) POINTING INPUT DEVICE, METHOD, AND SYSTEM USING IMAGE PATTERN

(75) Inventors: Dong-kyung Nam, Yongin-si (KR); Ho-joon Yoo, Yongin-si (KR); Woo-jong Cho, Yongin-si (KR); Moon-sik Jeong, Yongin-si (KR); Chang-su Kim, Yongin-si (KR); Sun-gi Hong, Yongin-si (KR); Yong-gook Park, Yongin-si (KR); Jung-hyun Shim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1221 days.

(21) Appl. No.: 11/711,034

(22) Filed: Feb. 27, 2007

(65) Prior Publication Data

US 2007/0216644 A1 Sep. 20, 2007

(30) Foreign Application Priority Data

Mar. 20, 2006 (KR) .................. 10-2006-0025439
Jan. 3, 2007 (KR) .................. 10-2007-0000795

(51) Int. Cl.
*G09G 5/08* (2006.01)
(52) U.S. Cl. ........................................... 345/158
(58) Field of Classification Search ........... 345/156–173
See application file for complete search history.

(56) References Cited

U.S. PATENT DOCUMENTS 6,727,885 B1 * 4/2004 Ishino et al. .................. 345/156
2002/0107069 A1 8/2002 Ishino
2004/0021645 A1 * 2/2004 Kobayashi et al. ........... 345/173
2004/0257534 A1 12/2004 Tseng
2006/0152488 A1 * 7/2006 Salsman et al. ............... 345/158

FOREIGN PATENT DOCUMENTS

| CN | 1299987 A | 6/2001 |
|---|---|---|
| CN | 1534446 A | 10/2004 |
| EP | 0728503 A1 | 8/1996 |
| GB | 2260188 A | 4/1993 |
| JP | 07-262347 | 10/1995 |
| JP | 2001-236181 | 8/2001 |
| JP | 2003-029927 | 1/2003 |
| JP | 2003044220 A * | 2/2003 |
| JP | 2003-91366 | 3/2003 |
| JP | 2003-233460 | 8/2003 |
| JP | 2003-234983 | 8/2003 |

* cited by examiner

*Primary Examiner* — Richard Hjerpe
*Assistant Examiner* — Carolyn R Edwards
(74) *Attorney, Agent, or Firm* — Staas & Halsey LLP

(57) ABSTRACT

A pointing input device and method, a pointer control device and method, and an image pattern generation device and method which move a mouse pointer displayed in a display region according to the movement of a location pointed at by the pointing input device. The pointing input device includes an image reception unit capturing an image pattern, which is displayed in a display region of a perceived size and based on which the scope of the display region is sensed, and sensing the scope of the image pattern; a coordinate extraction unit extracting coordinates of a location pointed at in the display region based on a center of the sensed scope of the image pattern; and a transmission unit transmitting the extracted coordinates to a pointer control device which controls a mouse pointer displayed in the display region.

34 Claims, 14 Drawing Sheets

POINTING INPUT DEVICE, METHOD, AND SYSTEM USING IMAGE PATTERN

CROSS-REFERENCE TO RELATED APPLICATIONS

This application claims priority from Korean Patent Application No. 10-2006-0025439 filed on Mar. 20, 2006 and Korean Patent Application No. 10-2007-0000795 filed on Jan. 3, 2007, in the Korean Intellectual Property Office, the disclosures of which are incorporated herein by reference in their entirety.

BACKGROUND OF THE INVENTION

1. Field of the Invention

The present invention relates to a pointing input device and method, a pointer control device and method and an image pattern generation device and method, and more particularly, to a pointing input device and method, a pointer control device and method, and an image pattern generation device and method which move a mouse pointer displayed in a display region according to the movement of a location pointed at by the pointing input device.

2. Description of the Related Art

Direct pointing input devices are input devices which can extract a display region of a display device such as a digital television (TV), detect the location of a portion on the screen currently being pointed at by a pointer, and control the location of the pointer displayed on the screen of the display device according to the results of the detection.

Direct pointing input devices use a direct mapping method by which a pointer is displayed at a place pointed at by a user and thus can manipulate the location of a pointer more quickly and easily than pointing input devices such as mouses or keypads which use a relative mapping method. Also, direct pointing input devices can allow a user to control the location of a pointer from a distance.

Korean Patent Publication No. 2004-025992 discloses an apparatus and method for determining the location of a mouse-laser pointer which can function as a mouse as well as a laser pointer. In this invention, the location of the mouse-laser pointer is determined based on a sum image reflected by a screen. The sum image denotes a sum of an image formed on a screen after being projected by a projector and a laser image formed on the screen after being projected by a laser pointer. After the image, which is formed on the screen and included in the sum image, is compared with a computer image, the location of the mouse-laser pointer is determined based on the location of a laser image included in the sum image. Therefore, a lot of computation may be required for image comparison.

In this regard, it is required to develop a method of controlling or efficiently selecting a graphic object, which exists in a display region, according to the movement of a pointer of a pointing input device.

SUMMARY OF THE INVENTION

It is an aspect of the present invention to move a mouse pointer, which is displayed in a display region, and to select an object according to the movement of a location pointed at by a pointing input device.

It is also an aspect of the present invention to simultaneously control a plurality of mouse pointers using a plurality of pointing input devices and to select a plurality of objects.

However, the aspects of the present invention are not restricted to the ones set forth herein. The above and other aspects of the present invention will become more apparent to one of daily skill in the art to which the present invention pertains by referencing a detailed description of the present invention given below.

According to an aspect of the present invention, there is provided a pointing input device including an image reception unit capturing an image pattern, which is displayed in a display region of a perceived size and based on which the scope of the display region is sensed, and sensing the scope of the image pattern; a coordinate extraction unit extracting coordinates of a location pointed at in the display region based on a center of the sensed scope of the image pattern; and a transmission unit transmitting the extracted coordinates to a pointer control device which controls a mouse pointer displayed in the display region.

According to another aspect of the present invention, there is provided a pointer control device includes a reception unit receiving relative coordinates of one or more mouse pointers displayed in a display region; a coordinate determination unit determining absolute coordinates of the mouse pointers with reference to the relative coordinates; and a pointer movement unit moving the mouse pointers using the absolute coordinates.

According to another aspect of the present invention, there is provided an image pattern generation device including an image pattern generation unit generating an image pattern based on which the scope of a display region is sensed; and an image pattern output unit outputting the image pattern in the display region.

According to another aspect of the present invention, there is provided a pointing input method including (a) capturing an image pattern displayed in a display region of a perceived size; (b) sensing the scope of the image pattern; (c) extracting coordinates of a location pointed at in the display region based on a center of the sensed scope of the image pattern; and (d) transmitting the extracted coordinates.

According to another aspect of the present invention, there is provided a pointer control method including receiving relative coordinates of one or more mouse pointers displayed in a display region; determining absolute coordinates of the mouse pointers with reference to the relative coordinates; and moving the mouse pointers using the absolute coordinates.

According to another aspect of the present invention, there is provided an image pattern generation method including generating an image pattern based on which the scope of a display region is sensed; and outputting the image pattern.

According to another aspect of the present invention, there is provided a pointing input system including an image pattern generation device generating an image pattern, which is displayed in a display region of a perceived size and based on which the scope of the display region is sensed, and outputting the image pattern in the display region; and a pointing input device sensing the image pattern and extracting coordinates of a location pointed at in the display region.

According to another aspect of the present invention, there is provided a pointing input system including a pointing input device sensing an image pattern, which is displayed in a display region of a perceived size and based on which the scope of the display region is sensed, and extracting coordinates of a location pointed at in the display region; and a pointer control device receiving coordinates of one or more mouse pointers from the pointing input device and controlling the mouse pointers.

According to another aspect of the present invention, there is provided a pointing input system including an image pattern generation device generating an image pattern, which is displayed in a display region of a perceived size and based on which the scope of the display region is sensed, and outputting the image pattern in the display region; a pointing input device sensing the image pattern and extracting coordinates of a location pointed at in the display region; and a pointer control device receiving coordinates of one or more mouse pointers from the pointing input device and controlling the mouse pointers.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
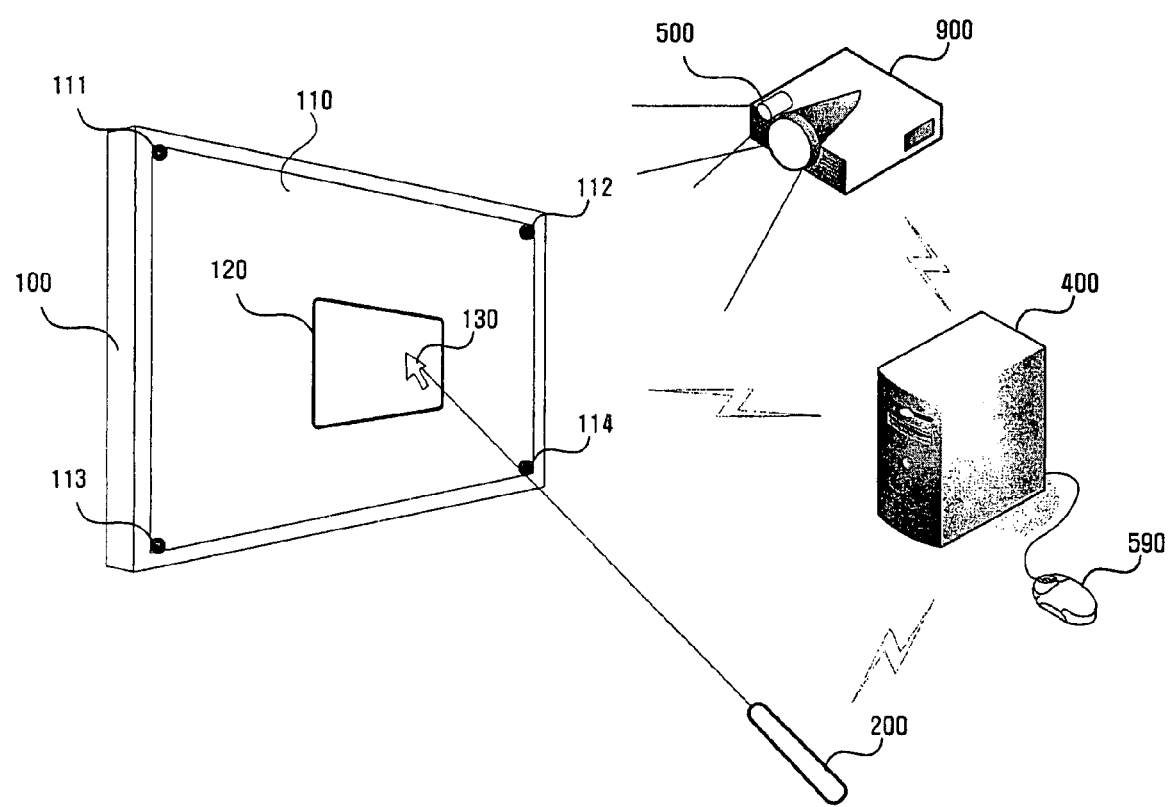
FIG. 1 is a conceptual diagram illustrating the movement of a mouse pointer and a graphic object according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Embodiments of the present invention will hereinafter be described in detail with reference to the accompanying drawings.

FIG. 1 is a conceptual diagram illustrating the movement of a mouse pointer 130 and a graphic object 120 according to an embodiment of the present invention. Referring to FIG. 1, a system for moving the graphic object 120 according to the movement of the mouse pointer 130 includes a pointing input device 200, a pointer control device 400, a projector 900, and a display device 100.

The pointer control device 400 generates image patterns 111 through 114, based on which the pointing input device 200 can estimate the scope of a display region 110, the graphic object 120, and the mouse pointer 130.

A personal computer with a built-in central processing unit (CPU) may be used as the pointer control device 400. Accordingly, a user may control the movement of the mouse pointer 130 using a mouse 590 which is connected to the pointer control device 400. In addition, the user may control the movement of the graphic object 120 by dragging and dropping the graphic object 120 using a button included in the mouse 590.

The user may point at a location in the display region 110 using the pointing input device 200. In this case, the pointing input device 200 may perceive the location using the image patterns 111 through 114 of the display region 110.

The pointing input device 200 may analyze the image patterns 111 through 114 displayed in the display region 110 and estimate the scope of the display region 110. Based on the estimated scope, the pointing input device 200 may extract coordinates of the location pointed at in the perceived display region 110. Alternatively, the pointing input device 200 may extract actual coordinates of the location pointed at in the actual display region 110 using the actual size of the display region 110.

The pointer control device 400 and the pointing input device 200 may be hard-wired or wirelessly communicate with each other. The pointing input device 200 transmits the extracted coordinates of the location pointed at to the pointer control device 400. Accordingly, the pointer control device 400 converts the received coordinates into coordinates of the location in the actual display region 110. In this case, if a control signal generated by a button included in the pointing input device 200 is transmitted to the pointer control device 400, the pointer control device 400 may generate a button down event of the mouse 590 and drag and drop the graphic object 120.

For example, the graphic object 120 may exist at the location pointed at by the pointing input device 200, and the user may move the location pointed at while selecting the button included in the pointing input device 200. In this case, the pointing input device 200 analyzes the displayed image patterns 111 through 114 and estimates the scope of the display region 110. Then, the pointing input device 200 extracts coordinates of the location pointed at in the perceived display region 110. The extracted coordinates and a control signal generated by the selected button are transmitted to the pointer control device 400. That is, coordinates of the location being moved and the control signal generated by the selected button are continuously transmitted to the pointer control device 400.

The pointer control device 400 generates the button down event in response to the control signal and converts the received coordinates into actual coordinates of the mouse pointer 130. Generally, in the case of Windows, which is an operating system (OS) of Microsoft, and Mac which is an OS of Macintosh, if the mouse pointer 130 is moved while a left button down event of the mouse 590 is generated, the graphic object 120 is dragged accordingly. In this way, the pointer control device 400 moves the mouse pointer 130 to the actual coordinates, into which the received coordinates have been converted, and drags the graphic object 120.

A case where the pointing control device moves the graphic object 120 after receiving the coordinates and the control signal has been described above as an example. However, when receiving relative coordinates of the mouse pointer 130 and a control signal generated by a button, the pointing control device 400 may also draw a picture or select an object (selecting some of a plurality of displayed icons).

Images generated by the pointer control device 400, such as the graphic object 120 and the mouse pointer 130, are transmitted to the projector 900, which, in turn, outputs the received images. That is, the projector 900 outputs projected versions of the received images. The projector 900 may include an image pattern generation device 500. The image pattern generation device 500 generates and outputs the image patterns 111 through 114 which are embodied as visible light, infrared light, or ultraviolet light.

The display device 100 displays the images projected by the projector 900, such as the graphic object 120 and the mouse pointer 130, and the image patterns 111 through 114 output from the image pattern generation device 500. If images are projected by the projector 900, the display device 100 may be replaced as a screen and reflect incident light.

The display device 100 may be implemented as a projection-type display device. In this case, the image pattern generation device 500 may be inserted into the display device 100. That is, the image pattern generation device 500 inserted into the display device 100 enables the image patterns 111 through 114 to transmit through a projection screen so that the image patterns 111 through 114 can be perceived by the pointing input device 200.

Figure 2:
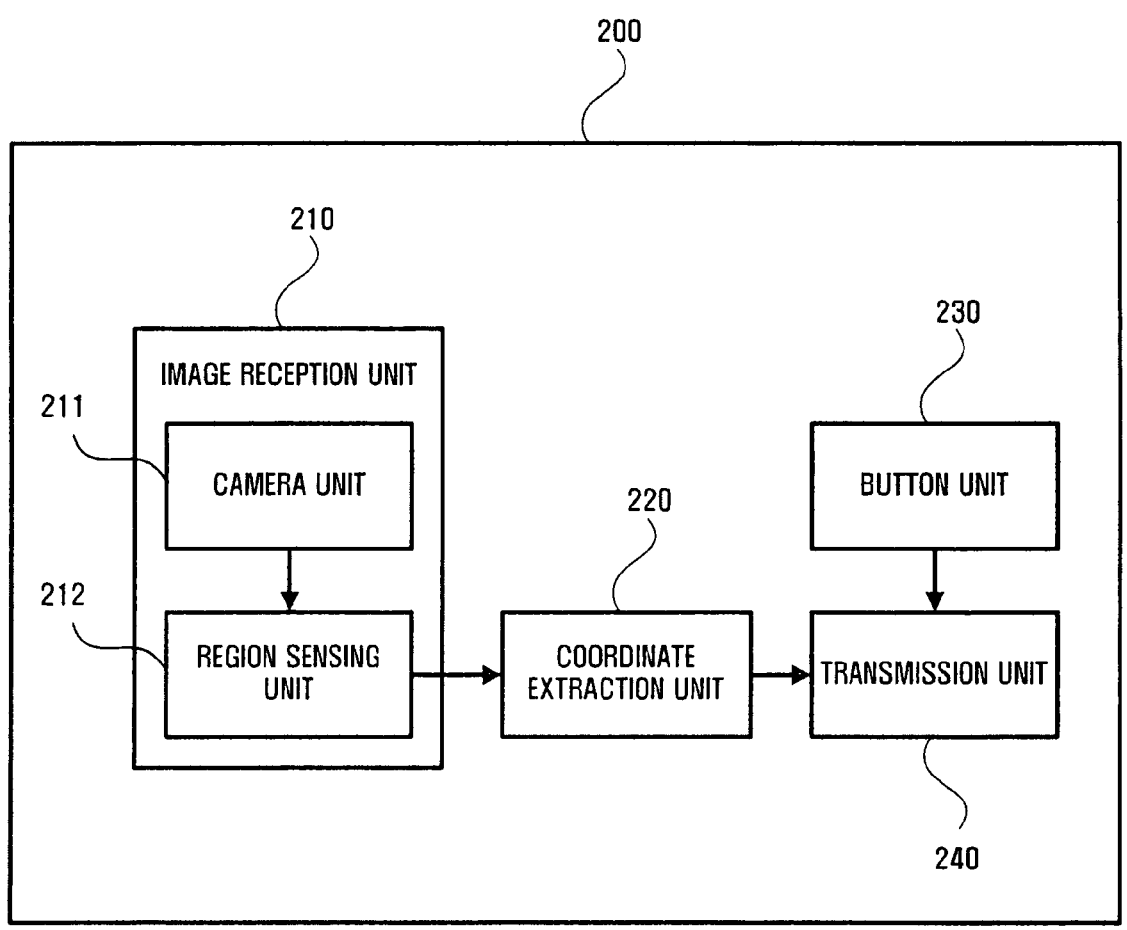
FIG. 2 is a block diagram of a pointing input device according to an embodiment of the present invention.

FIG. 2 is a block diagram of a pointing input device 200 according to an embodiment of the present invention. Referring to FIG. 2, the pointing input device 200 includes an image reception unit 210, a coordinate extraction unit 220, a button unit 230, and a transmission unit 240.

The image reception unit 210 captures an image pattern displayed in a display region of a perceived size and senses the scope of the image pattern. To this end, the image reception unit 210 may include a camera unit 211 and a region sensing unit 212.

The camera unit 211 captures the image pattern displayed in the display region of the perceived size. As described above, the image pattern may be embodied as visible light, infrared light, or ultraviolet light. If the image pattern is embodied as visible light, the camera unit 211 may capture the image pattern by functioning as a general digital camera. If the image pattern is embodied as infrared light or ultraviolet light, the camera unit 211 may capture the image pattern by functioning as an infrared camera or an ultraviolet camera.

The region sensing unit 212 senses the scope of the image pattern. For example, if a plurality of partial images that form the image pattern are displayed in the display region, the region sensing unit 212 may sense the scope of the image pattern using the disposition of the partial images. After sensing the scope of the image pattern, the image sensing unit 212 may sense center coordinates of the image pattern.

The coordinate extraction unit 220 extracts coordinates of a location pointed at in the display region based on the center of the image pattern. That is, the coordinate extraction unit 220 extracts a distance between the center of the image pattern and the location pointed at. Therefore, coordinates actually extracted by the coordinate extraction unit 220 may be coordinates corresponding to a ratio of the actual size of the image pattern to the perceived size of the image pattern. For example, if the actual size of the image pattern is 10×10, the perceived size of the image pattern is 30×30, and coordinates of the location pointed at with respect to the center of the image pattern are (20, 15), the coordinates extracted by the coordinate extraction unit 220 are (20×(10/30), 15×(10/30)), i.e., (6.67, 5).

The coordinates thus extracted are calculated based on the center of the image pattern. The coordinate extraction unit 220 may extract actual coordinates of the location in the actual display region using the actual size of the display region. For example, in the above condition, if the actual size of the display region is 100×100 and the image pattern is disposed at the center of the display region, the actual coordinates of the location pointed at are (50+6.67, 50+5), i.e., (56.67, 55).

The coordinates extracted by the coordinate extraction unit 220 may correspond to coordinates of a mouse pointer displayed in the display region. That is, when receiving the extracted coordinates, the pointer control device 400 may position the mouse pointer to the received coordinates.

The button unit 230 receives a user command for generating a button down event to move the mouse pointer displayed in the display region. That is, a user may select a button (hereinafter, referred to as a first button) included in the button unit 230 in order to move a graphic object, select an icon or draw a picture.

The pointing input device 200 may also include an optical transmission unit (not shown) emitting light to a location pointed at. The button unit 230 may include a button (hereinafter, referred to as a second button) for controlling the optical transmission unit (not shown) to emit light. That is, the user may perceive the location pointed at by making the location reflect light using the second button. In addition, the user may move a displayed graphic object using the first button.

The transmission unit 240 transmits at least one of a control signal generated by the first button and the coordinates extracted by the coordinate extraction unit 220 to the pointer control device 400. The transmission unit 240 may communicate with the pointer control device 400 using a wired communication method such as Ethernet, universal serial bus (USB), IEEE 1394, serial communication or parallel communication, or a wireless communication method such as infrared communication, Bluetooth, home radio frequency (HomeRF) or wireless local area network (WLAN).

Figure 3:
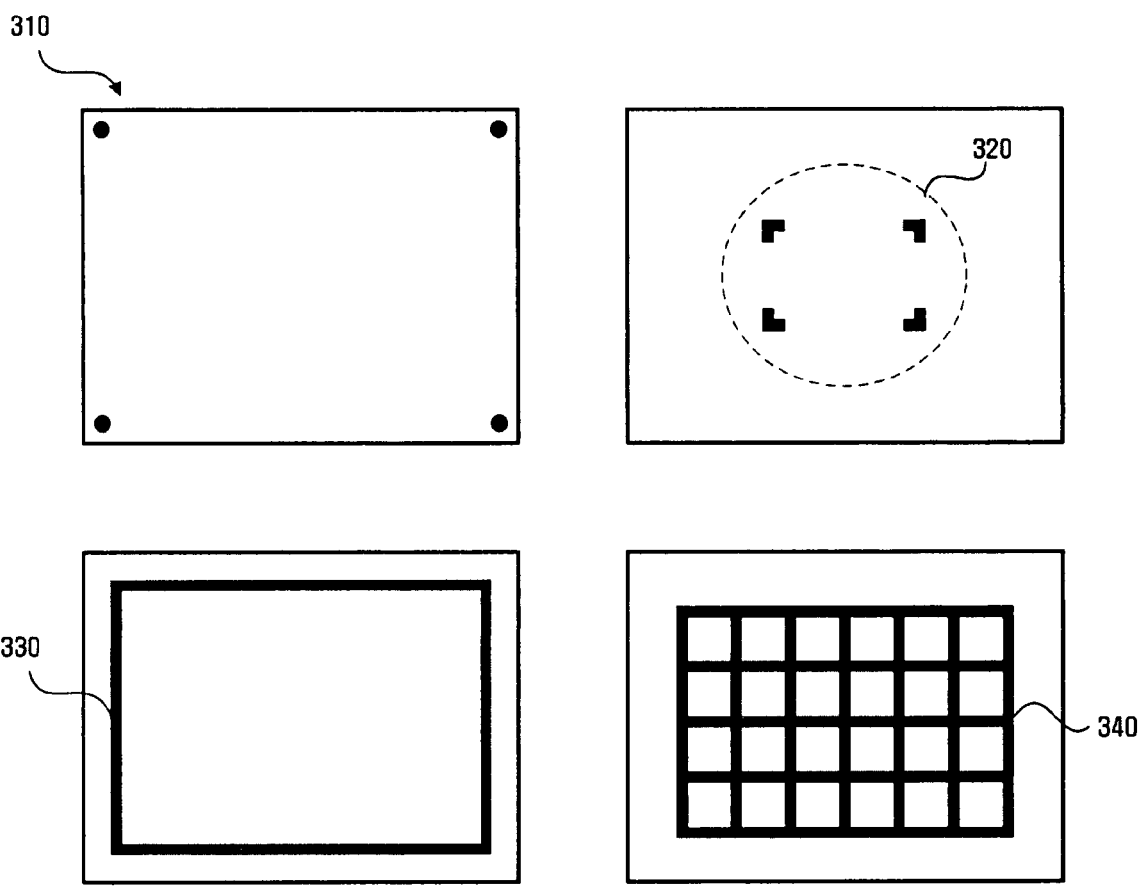
FIG. 3 illustrates various forms of image patterns according to an embodiment of the present invention.

FIG. 3 illustrates various forms of image patterns according to an embodiment of the present invention.

Referring to FIG. 3, various forms of image patterns 310 through 340 may be generated. That is, an image pattern composed of a plurality of partial images may be generated, such as the image patterns 310 and 320. Alternatively, an image pattern composed of a single image may be generated, such as the square image pattern 330 or the checked image pattern 340.

When an image pattern is displayed on a display device, a graphic object that needs to be visually transmitted to a user may be hidden by the image pattern. In order to prevent this situation, the image pattern may be embodied as infrared light or ultraviolet light as described above.

Figure 4:
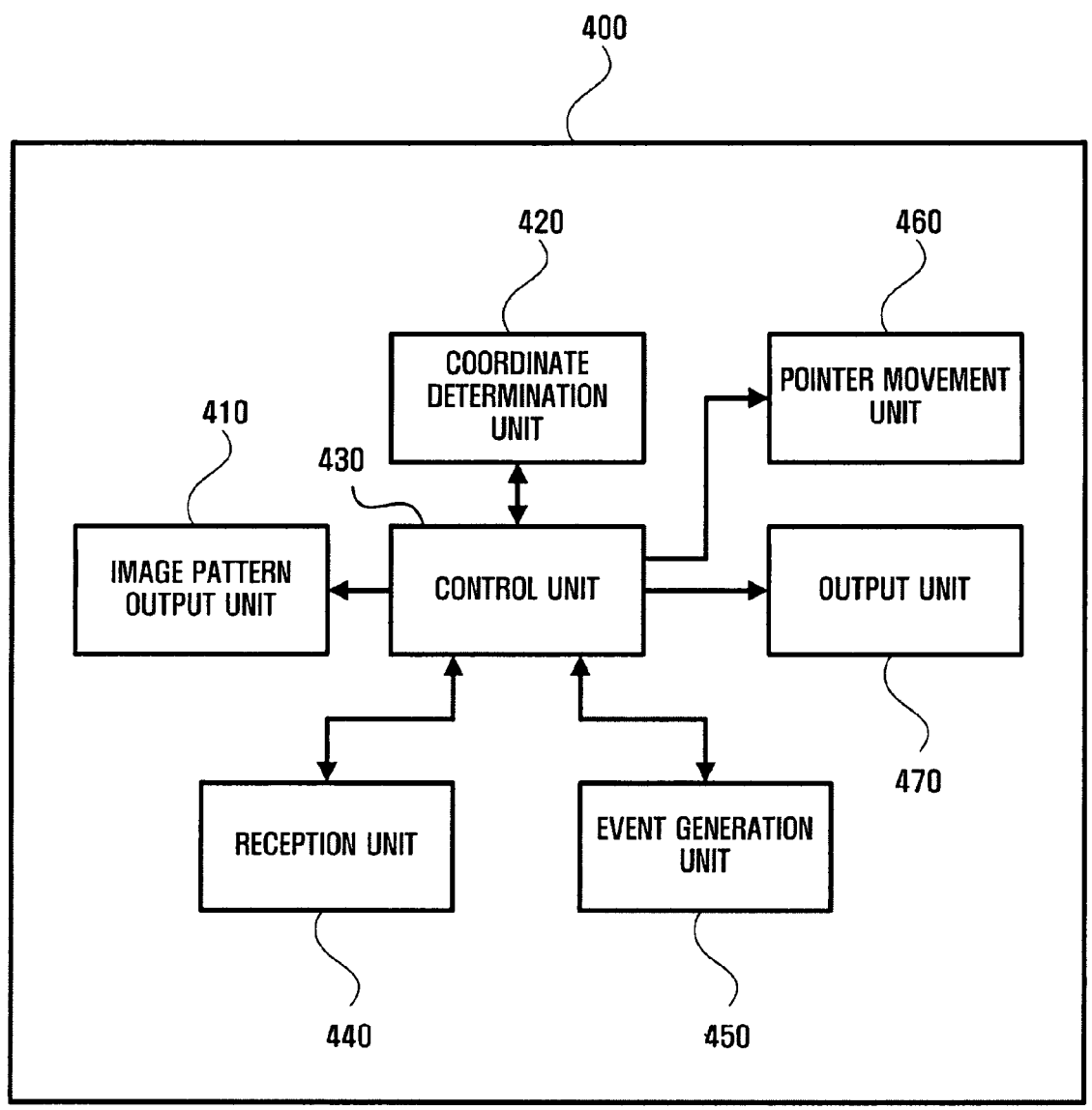
FIG. 4 is a block diagram of a pointer control device according to an embodiment of the present invention.

FIG. 4 is a block diagram of a pointer control device 400 according to an embodiment of the present invention. Referring to FIG. 4, the pointer control device 400 includes an image pattern output unit 410, a coordinate determination unit 420, a control unit 430, a reception unit 440, an event generation unit 450, a pointer movement unit 460, and an output unit 470.

The image pattern output unit 410 outputs an image pattern. That is, as illustrated in FIG. 3, the image pattern output unit 410 may generate an image pattern composed of a plurality of partial images or generate a square or checked image pattern. Therefore, the image pattern output unit 410 functions as the image pattern generation device 500 illustrated in FIG. 1. An image pattern may also be generated by the separate image pattern generation device 500 instead of the image pattern output unit 410.

The actual size of a display region and the size of an image pattern are transmitted to the pointing input device 200 so that the pointing input device 200 can sense coordinates of a location pointed at in the display region. The image pattern output from the image pattern output unit 410 may be embodied as infrared light or ultraviolet light as described above.

The reception unit 440 receives relative coordinates of one or more mouse pointers displayed in the display region. The relative coordinates denote coordinates of the mouse pointers with respect to a center of the image pattern. In addition, the reception unit 440 receives a control signal for generating a button down event to move the mouse pointers. That is, the reception unit 440 communicates with the pointing input device 200 to receive a control signal or coordinates. The reception unit 440 may communicate with the pointing input device 200 using a wired communication method such as Ethernet, USB, IEEE 1394, serial communication or parallel communication, or a wireless communication method such as infrared communication, Bluetooth, HomeRF or WLAN.

The coordinate determination unit 420 determines absolute coordinates of the mouse pointers with reference to the relative coordinates received by the reception unit 440. For example, the center of the image pattern may match that of the display region, the size of the display region may be 800×600, and the received relative coordinates may be (20, 10). In this case, the absolute coordinates of a mouse pointer may be (800+20, 600+10), i.e., (820, 610).

The reception unit 440 may receive a plurality of relative coordinates of the mouse pointers. In this case, the coordinate determination unit 420 may determine a plurality of absolute coordinates respectively corresponding to the relative coordinates.

Alternatively, the reception unit 440 may receive absolute coordinates of the mouse pointers from the pointing input device 200 which is aware of the actual size of the display region. In this case, the coordinate determination unit 420 may not be operated.

The event generation unit 450 generates a mouse button down event in response to a control signal. The mouse button down event is generated in order to move a graphic object, draw a picture or select an icon. The mouse button down event includes a mouse button event generated by Windows, which is an OS of Microsoft, or Mac, which is an OS of Macintosh, in order to move a graphic object.

Therefore, an event generated by the event generation unit 450 is not limited to the mouse button down event but includes all events required to, for example, move a graphic object.

After the event generation unit 450 generates the event and the coordinate determination unit 420 determines the absolute coordinates of the mouse pointers, the pointer movement unit 460 moves the mouse pointers to the absolute coordinates determined by the coordinate determination unit 420.

The output unit 470 outputs an image of a graphic object and images of the mouse pointers. The output images may be transmitted directly to the projection-type display device 100 and displayed thereon. Alternatively, the output images may be transmitted to the projector 900 and displayed on a screen of the projector 900.

The control unit 430 controls the image pattern output unit 410, the coordinate determination unit 420, the reception unit 440, the event generation unit 450, the pointer movement unit 460, the output unit 470 included in the pointer control device 400.

The control unit 430 may check whether the reception unit 440 has received the control signal. The control unit 430 may control the event generation unit 450 to generate the mouse button down event and control the coordinate determination unit 420 to extract the absolute coordinates of the mouse pointers when the control signal is received.

That is, if the control signal is not received, the control unit 430 may control the event generation unit 450 not to generate the mouse button down event and control the coordinate determination unit 420 not to extract the absolute coordinates of the mouse pointers.

Figure 5:
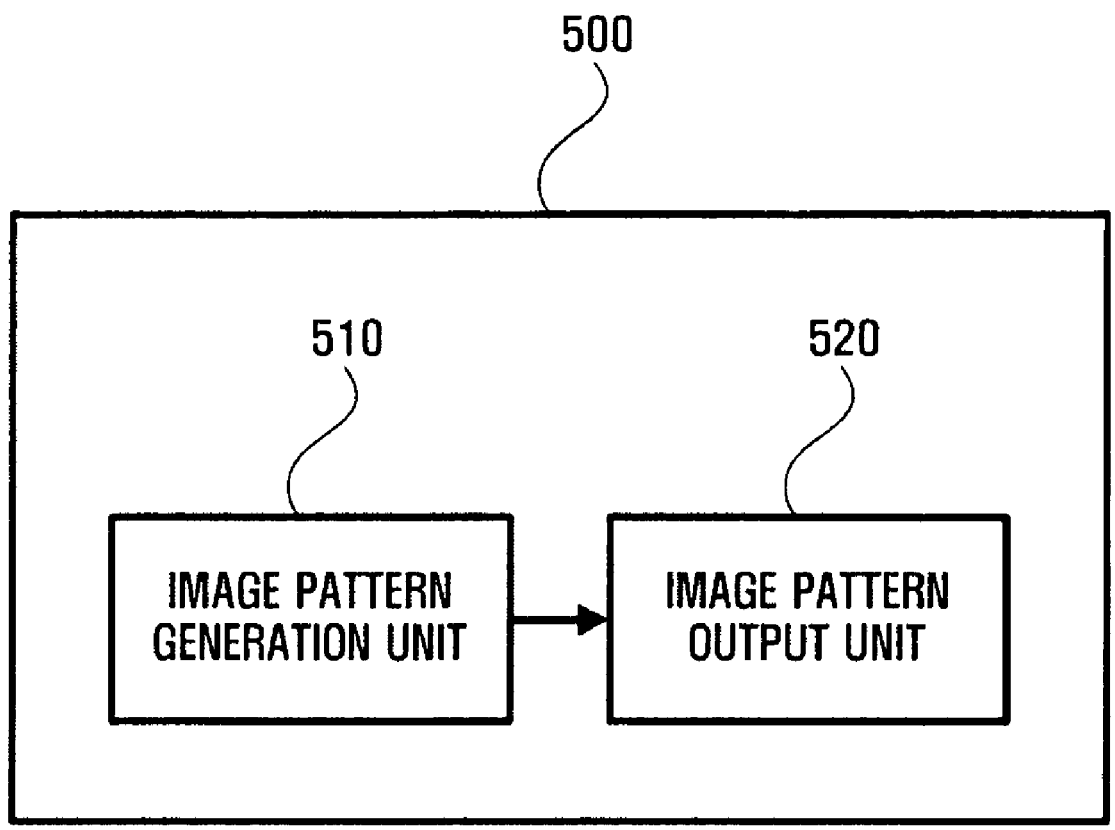
FIG. 5 is a block diagram of an image pattern generation device according to an embodiment of the present invention.

FIG. 5 is a block diagram of an image pattern generation device 500 according to an embodiment of the present invention. Referring to FIG. 5, the image pattern generation device 500 includes an image pattern generation unit 510 and an image pattern output unit 520.

The image pattern generation unit 510 generates an image pattern based on which the scope of a display region is estimated. As described above, the image pattern may be embodied as visible light, infrared light, or ultraviolet light.

The image pattern output unit 520 outputs the image pattern generated by the image pattern generation unit 510. The image pattern may be output in the display region using a grid having various geometric shapes. Since the various geometric shapes have been described above, a detailed description thereof will be omitted here.

The image pattern generation device 500 may be inserted into the projector 900 and operated accordingly or may be operated separately. In addition, if the display device 100 is a projection-type display device, the image pattern generation device 500 may be included in the display device 100 and output an image pattern.

Figure 6:
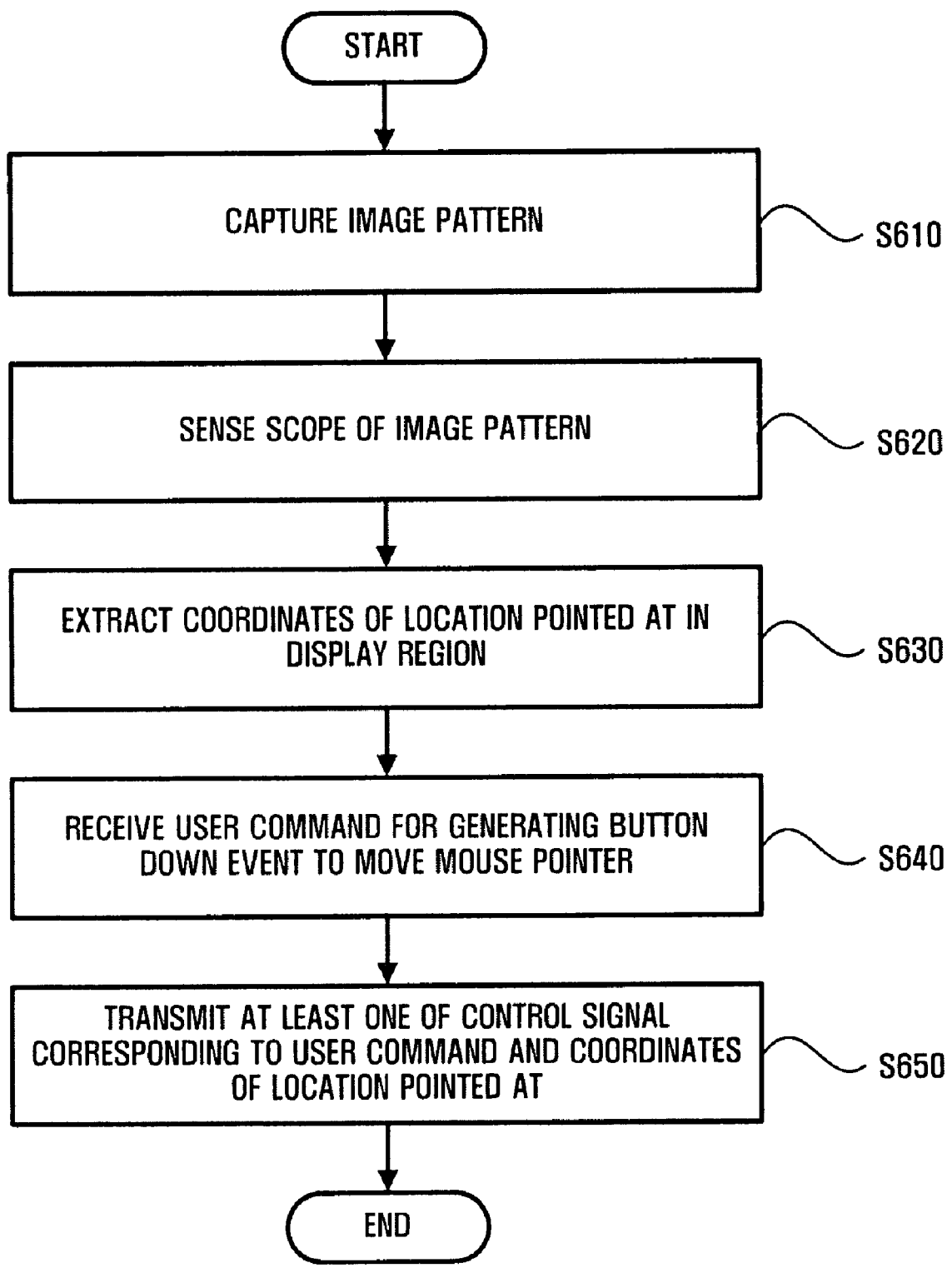
FIG. 6 is a flowchart illustrating the operation of the pointing input device according to an embodiment of the present invention.

FIG. 6 is a flowchart illustrating the operation of the pointing input device 200 according to an embodiment of the present invention.

Referring to FIG. 6, the camera unit 211 of the pointing input device 200 captures an image pattern displayed in a perceived display region (operation S610). Here, the image pattern may be embodied as visible light, infrared light or ultraviolet light. Accordingly, the camera unit 211 may capture the image pattern by functioning as a digital camera, an infrared camera, or an ultraviolet camera.

The captured image pattern is transmitted to the region sensing unit 212, which, in turn, senses the scope of the image pattern (operation S620).

The scope of the image pattern sensed by the region sensing unit 212 is transmitted to the coordinate extraction unit 220, and the coordinate extraction unit 220 extracts coordinates of a location pointed at in the display region based on a center of the image pattern (operation S630).

The button unit 230 receives a user command for generating a button down event to move a mouse pointer displayed in the display region (operation S640). After receiving the user command, the button unit 230 generates a corresponding control signal and transmits the generated control signal to the transmission unit 240.

The transmission unit 240 transmits at least one of the control signal generated by the button unit 230 and the coordinates of the location extracted by the coordinate extraction unit 220 to the pointer control device 400 (operation S650).

After receiving relative coordinates of the located pointed at, the pointer control device 400 moves the mouse pointer to absolute coordinates corresponding to the relative coordinates. In addition, the pointer control device 400 moves a graphic object, draws a picture, or selects an icon in response to the control signal.

Figure 7:
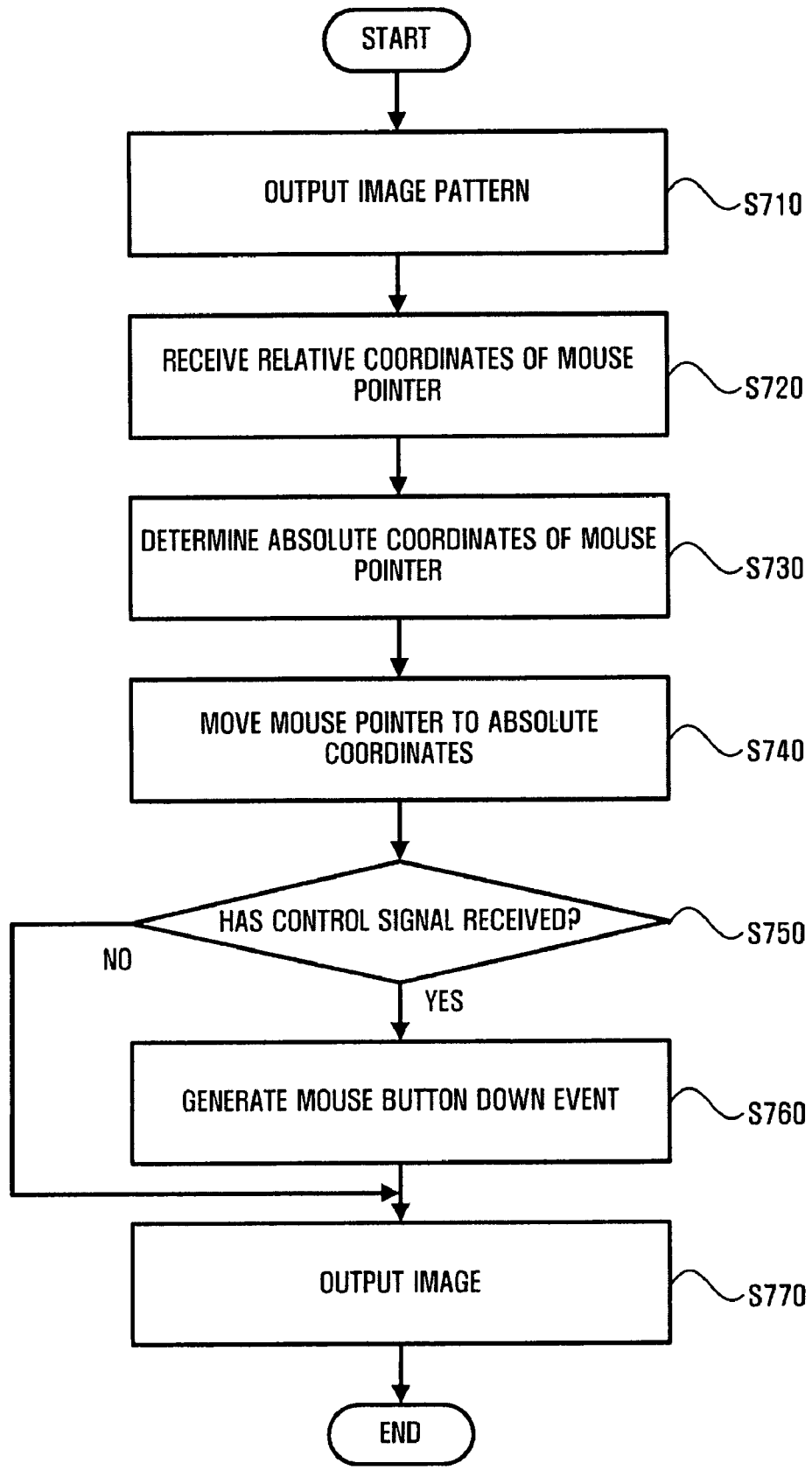
FIG. 7 is a flowchart illustrating the operation of the pointer control device according to an embodiment of the present invention.

FIG. 7 is a flowchart illustrating the operation of the pointer control device 400 according to an embodiment of the present invention.

Referring to FIG. 7, the image pattern output unit 410 of the pointer control device 400 outputs an image pattern in order to move a mouse pointer (operation S710).

The image pattern may be embodied as visible light, infrared light, or ultraviolet light. The image pattern output unit 410 may output the image pattern using a digital image output unit, an infrared image output unit, or an ultraviolet image output unit.

If an image pattern is output from a separate device, the image pattern output unit 410 may not output an image pattern.

The reception unit 440 receives relative coordinates of one or more mouse pointers displayed in a display region (operation S720). The relative coordinates are transmitted to the coordinate determination unit 420. Accordingly, the coordinate determination unit 420 determines absolute coordinates of the mouse pointers based on the received relative coordinates (operation S730). The determined absolute coordinates are transmitted to the pointer movement unit 460, which, in turn, moves the mouse pointers to the absolute coordinates (operation S740).

The control unit 430 checks whether the reception unit 440 has received a control signal (operation S750). If the control signal has been received by the reception unit 440, the control unit 430 transmits an event generation signal to the event generation unit 450. Accordingly, the event generation unit 450 generates a mouse button down event (operation S760).

After the mouse button down event is generated and the absolute locations of the mouse pointers are determined, the output unit 470 outputs an image of, for example, a graphic object (operation S770). That is, the output unit 470 outputs an image such as a moving graphic object, an icon selected from a plurality of icons, or a picture.

Figure 8:
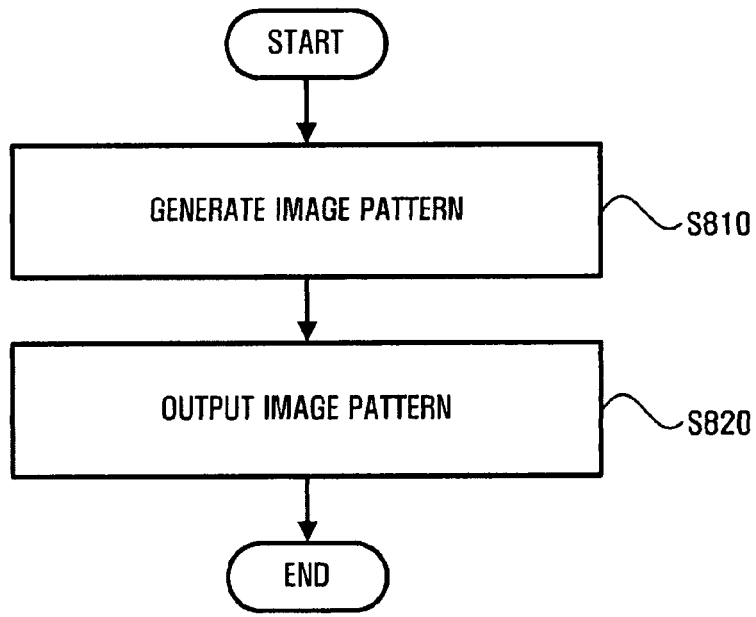
FIG. 8 is a flowchart illustrating the operation of the image pattern generation device according to an embodiment of the present invention.

FIG. 8 is a flowchart illustrating the operation of the image pattern generation device 500 according to an embodiment of the present invention.

Referring to FIG. 8, the image pattern generation unit 510 of the image pattern generation device 500 generates an image pattern based on which the scope of a display region is estimated (operation S810). The generated image pattern is transmitted to the image pattern output unit 520, and the image pattern output unit 520 outputs the received image pattern (operation S820). The image pattern may be embodied as visible light, infrared light or ultraviolet light.

According to an embodiment of the present invention, a plurality of users may simultaneously point at a plurality of locations in a display region using a plurality of pointing input devices. In this case, the locations respectively pointed at by the users can also be determined, which will now be described with reference to FIGS. 9 through 11.

Figure 9:
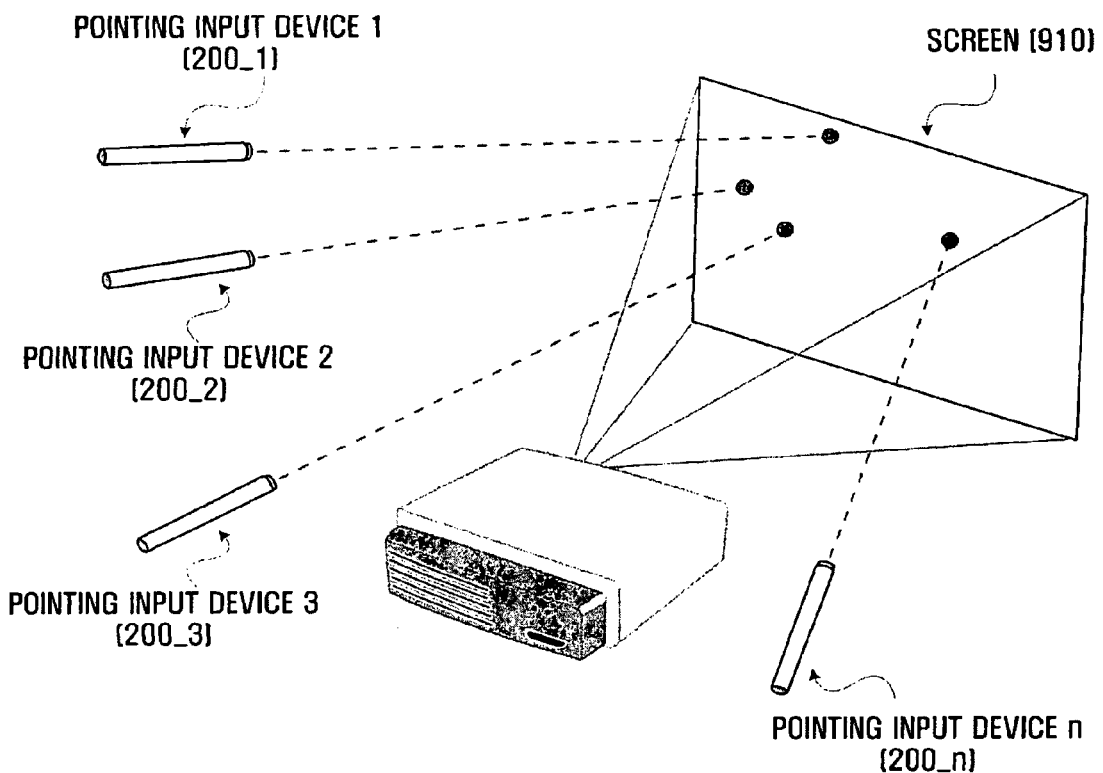
FIG. 9 is a conceptual diagram illustrating a case where a plurality of users point at a plurality of locations using a plurality of pointing input devices according to an embodiment of the present invention.

FIG. 9 is a conceptual diagram illustrating a case where a plurality of users point at a plurality of locations using a plurality of pointing input devices according to an embodiment of the present invention. In FIG. 9, a plurality of users point at a screen 910 using a plurality of pointing input devices 200_1 through 200_n. In this case, a plurality of referencing marks are set in a display region at which the pointing input devices 200_1 through 200_n are pointing. Therefore, locations pointed at by the pointing input devices 200_1 through 200_n** can be detected.

Figure 10:
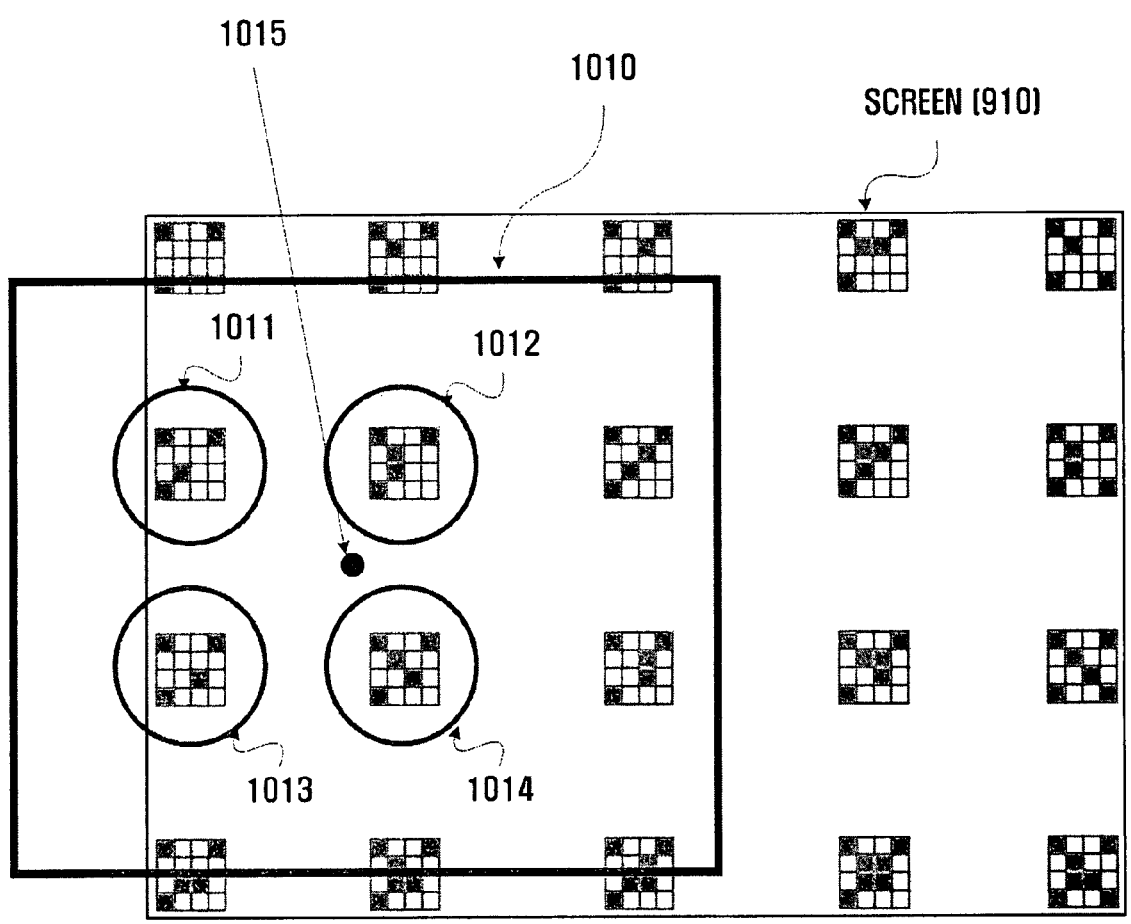
FIG. 10 illustrates a plurality of referencing marks projected in a display region.

FIG. 10 illustrates a plurality of referencing marks projected in a display region. The referencing marks may be one-dimensional (1D) or two-dimensional (2D) barcodes. Referring to FIG. 10, 2D barcodes having different shapes according to a location of a screen 910 are projected as the referencing marks. In this case, coordinates of a location pointed at by a pointing input device 200 can be accurately detected using four referencing marks 1011 through 1014 which are closest to a center 1015 of a detection region 1010 photographed using a camera (e.g., an infrared camera) that is attached to the pointing input device 200. A specific embodiment will be described with reference to FIG. 11.

Figure 11:
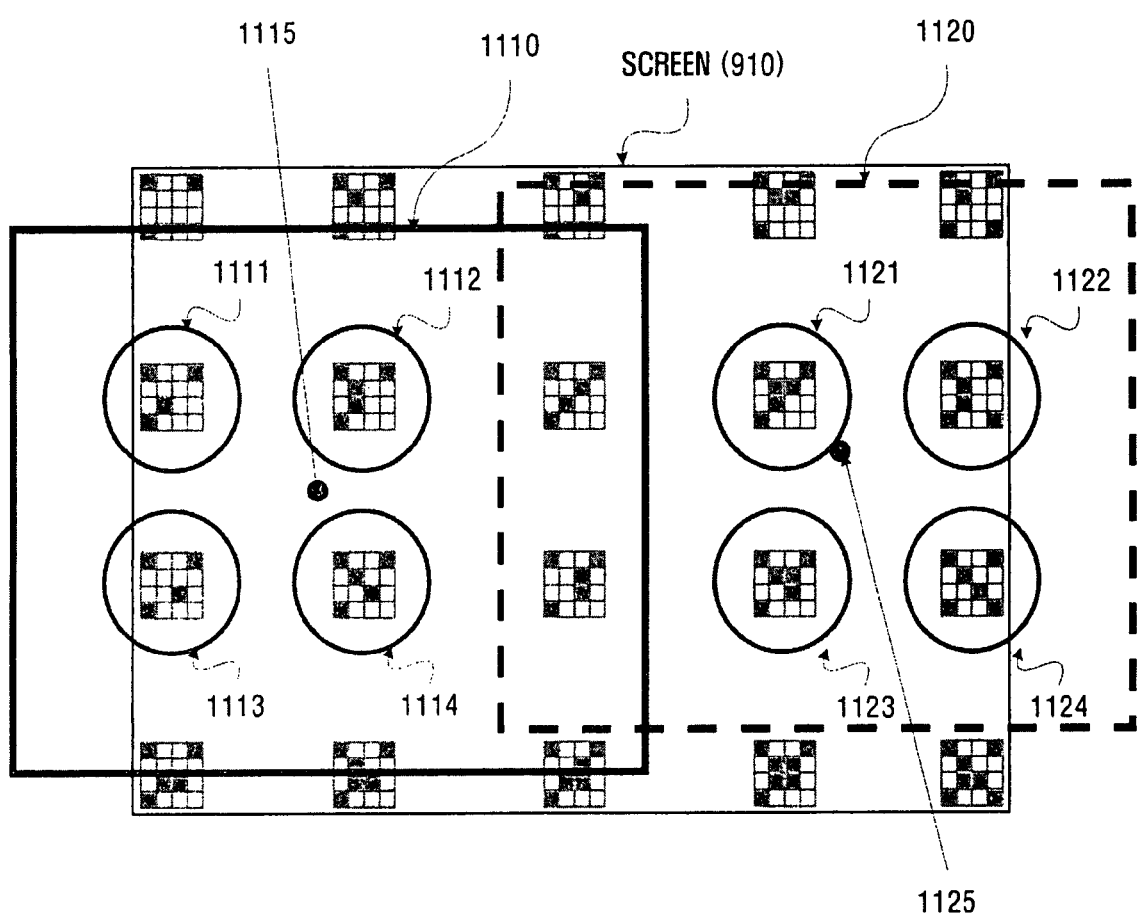
FIG. 11 illustrates a process of detecting locations simultaneously pointed at by two pointing input devices.

FIG. 11 illustrates a process of detecting locations simultaneously pointed at by two pointing input devices. Referring to FIG. 11, if a first user and a second user simultaneously point at a screen 910, a region 1110 detected by a pointing input device of the first user is different from a region 1120 detected by a pointing input device of the second user. Therefore, coordinates of locations respectively pointed at by the first and second users are detected using different referencing marks. That is, the pointing input device of the first user detects coordinates of the location, at which it is pointing, using four referencing marks 1111 through 1114 which are closest to its pointing center 1115. Similarly, the pointing input device of the second user detects coordinates of the location, at which it is pointing, using four referencing marks 1121 through 1124 which are closest to its pointing center 1125. Therefore, no matter how many users simultaneously point at the screen 910, locations pointed at by the users can be accurately detected.

According to another embodiment of the present invention, even when part of a display region is hidden by another user or object, coordinates of a location pointed at can be effectively detected, which will be described with reference to FIGS. 12 through 15.

Figure 12:
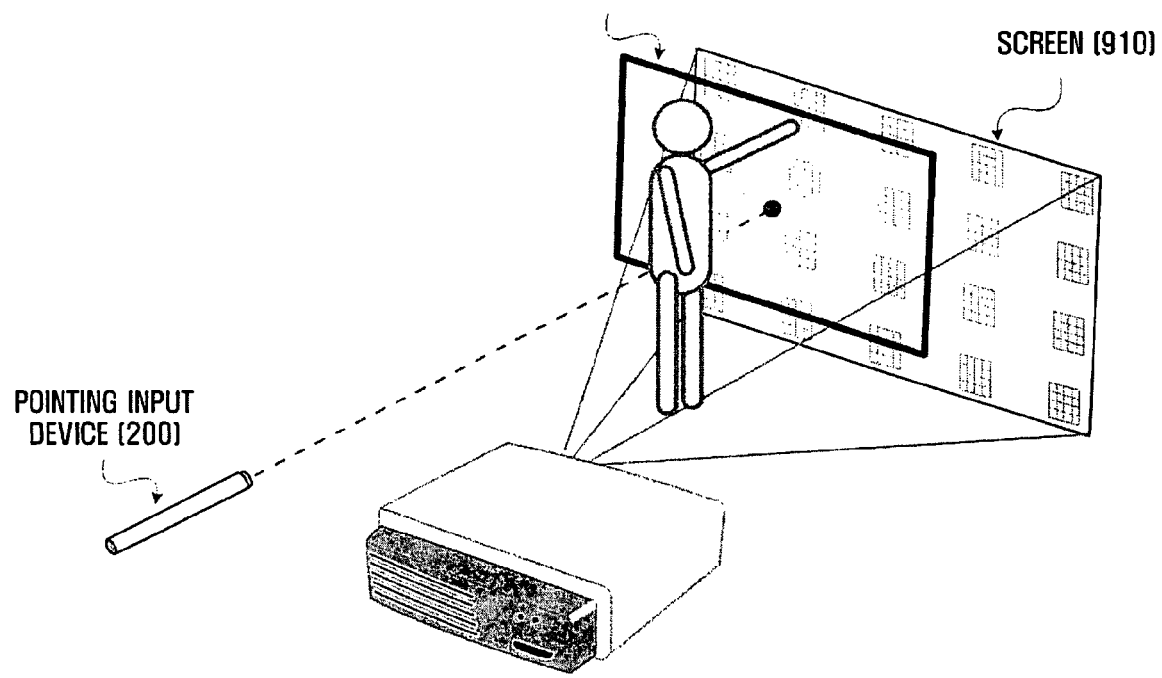
FIG. 12 illustrates a case where part of a display region is hidden by another user.
Figure 13:
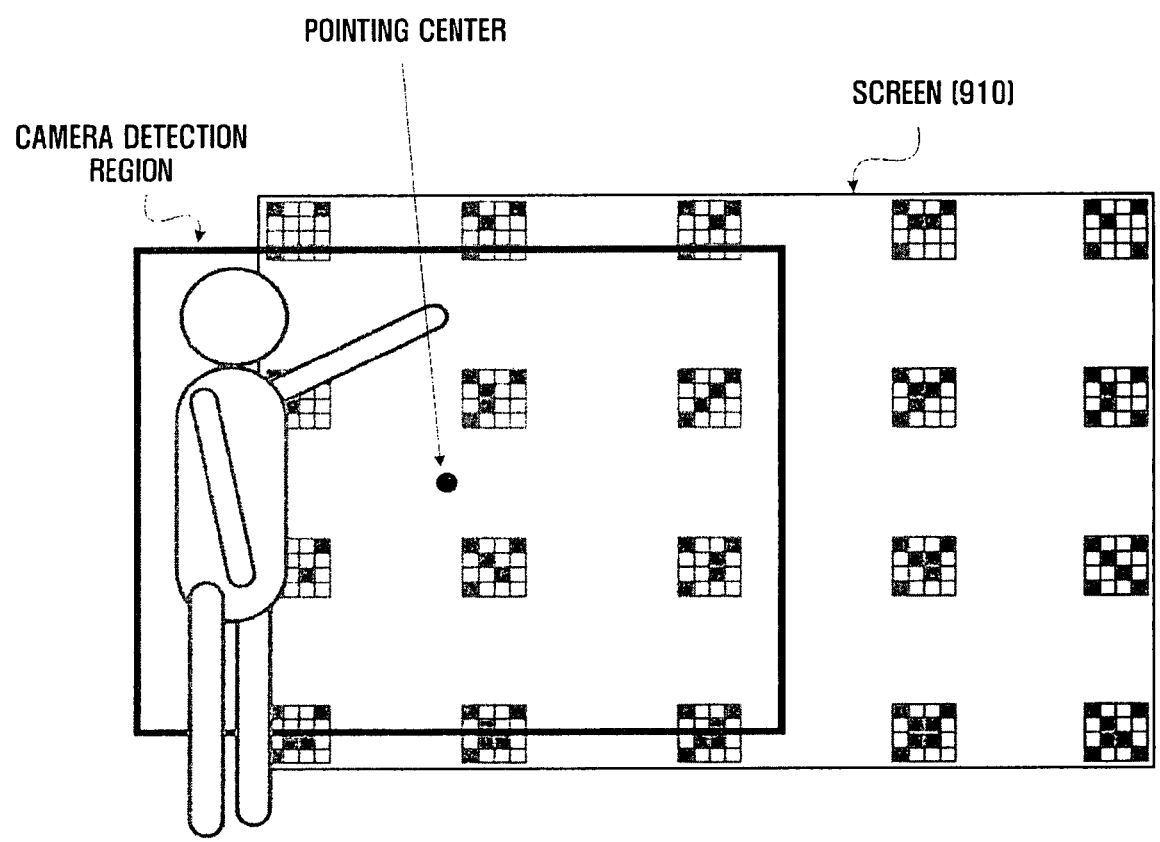
FIG. 13 is an enlarged version of FIG. 12.

FIG. 12 illustrates a case where part of a display region is hidden by another user. FIG. 13 is an enlarged version of FIG. 12.

As described above in the embodiment in which a plurality of users simultaneously point at a screen, different forms of referencing marks are projected according to a location of a display region. In a screen photographed by a camera (e.g., an infrared camera) attached to a pointing input device, some of the four referencing marks may be hidden as illustrated in FIG. 13, thereby making it impossible to detect coordinates of a location pointed at. In this case, the camera (not shown), which is attached to the pointing input device, or an image pattern generation device 500 may directly zoom in to generate a new image pattern or zoom out to detect coordinates of the location pointed at using newly included referencing marks. A detailed description of this process will now be described with reference to FIGS. 14 and 15.

Figure 14:
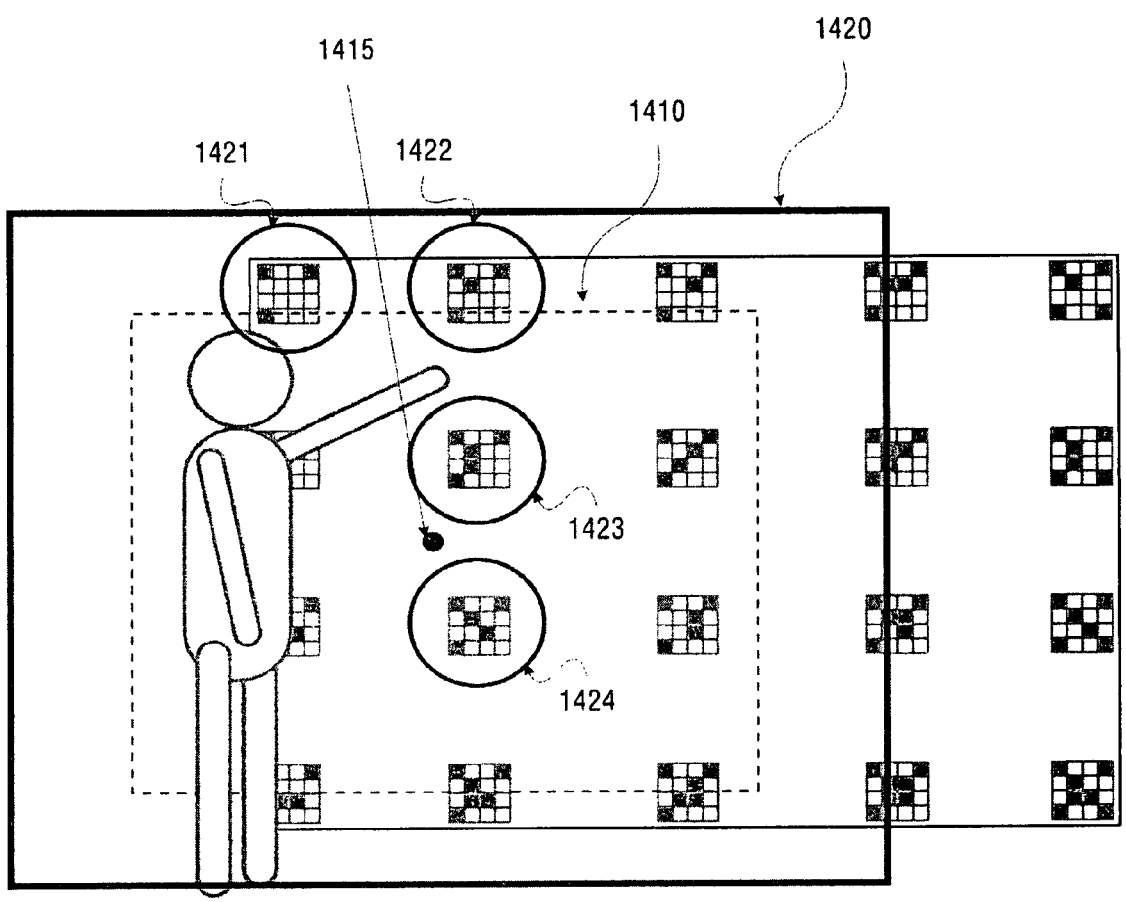
FIG. 14 illustrates a process of detecting a location pointed at using a zoom-out function.

FIG. 14 illustrates a process of detecting a location pointed at using a zoom-out function. Referring to FIG. 14, a camera (not shown) of a pointing input device 200 initially detects a first detection region 1410. Then, if part of the first detection region 1410 is hidden by another user, the camera zooms out to expand a photographing range and thus detects a second detection region 1420. In this case, a pointing center 1415 of the pointing input device 200 remains unchanged even after the zooming-out of the camera. In the second detection region 1420, which is wider than the first detection region 1410, four referencing marks 1421 through 1424, which are closest to the pointing center 1415, may be detected. Therefore, coordinates of the location pointed at by the pointing input device 200 can be detected using the referencing marks 1421 through 1424.

Figure 15:
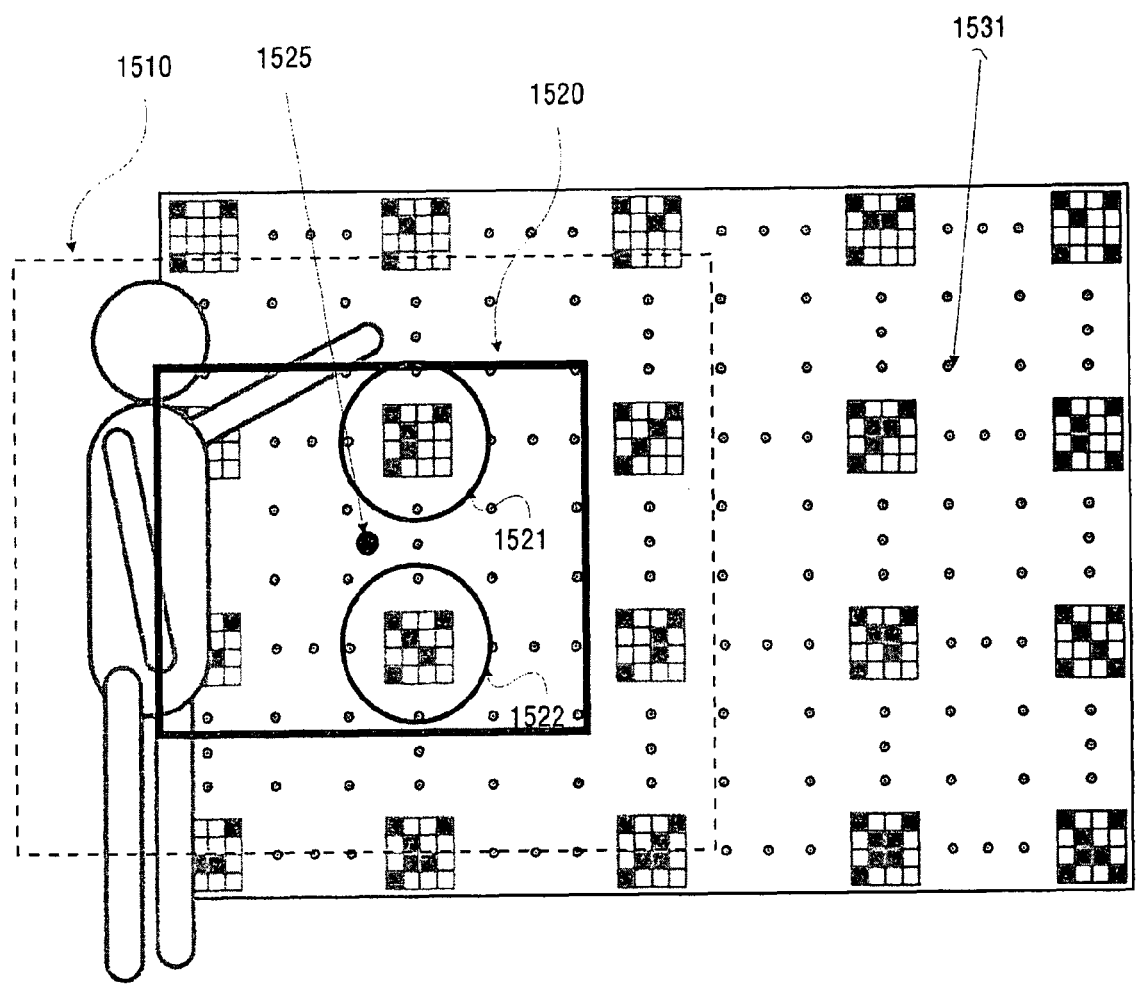
FIG. 15 illustrates a process of detecting a location pointed at using a zoom-in function.

FIG. 15 illustrates a process of detection a location pointed at using a zoom-in function. Referring to FIG. 15, a camera (not shown) of a pointing input device 200 initially detects a first detection region 1510. Then, if part of the first detection region 1510 is hidden by another user, the camera zooms in to reduce a photographing range and thus detects a second detection region 1520. In this case, a pointing center 1525 of the pointing input device 200 remains unchanged even after the zooming-in of the camera. When the camera zooms in, reference points 1531 at close intervals are projected onto a screen which already displays referencing marks. Therefore, the reference points 1531 replace some of the referencing marks hidden by another user. Since an interval between the referencing marks is predetermined, if one or more referencing marks (two referencing marks 1521 and 1522 in FIG. 15) photographed by the camera are included in the second detection region 1520 after the camera zooms in, coordinates of the location pointed at can be accurately detected based on the referencing marks 1521 and 1522. Here, the camera can zoom in again, thereby increasing the detection accuracy of the coordinates of the location pointed at.

As described above, a pointing input device and method, a pointer control device and method, and an image pattern generation device and method according to the present invention provide at least one of the following advantages.

First, a mouse pointer displayed in a display region is moved according to the movement of a location pointed at by a pointing input device. Therefore, a user can easily control a graphic object selected using the mouse pointer.

Second, a plurality of mouse pointers can be controlled using a plurality of pointing input devices. Therefore, a plurality of users can control graphic objects selected using different mouse pointers.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation.

What is claimed is:

1. A pointing input device comprising:
an image reception unit capturing an image pattern, which is outputted at a predetermined location of a display region to sense a scope of the display region of the display region of a display device;
a coordinate extraction unit extracting coordinates of a location pointed at in the display region based on a center of the sensed scope of the display region; and
a transmission unit transmitting the extracted coordinates to a pointer control device which controls a mouse pointer displayed in the display region,
wherein the coordinate extraction unit applies the extracted coordinates to an actual size of the display region and extracts coordinates of the location pointed at in the display region of the actual size.

2. The pointing input device of claim 1, wherein the image reception unit captures the image pattern which comprises one of visible light, infrared light, or ultraviolet light.

3. The pointing input device of claim 1, wherein the coordinates correspond to coordinates of the mouse pointer.

4. The pointing input device of claim 1, further comprising a button unit receiving a user command for generating a button down event to move the mouse pointer.

5. The pointing input device of claim 4, wherein the transmission unit transmits a control signal to the pointer control device in response to the user command.

6. A pointer control device comprising:
a reception unit receiving relative coordinates of two or more mouse pointers displayed in a display region of a display device from a pointing input device;
a coordinate determination unit determining absolute coordinates of the mouse pointers with reference to the relative coordinates;
a pointer movement unit moving the mouse pointers using the absolute coordinates; and
an image pattern output unit outputting an image pattern, based on which the scope of the display region is sensed, at a predetermined location of the display region,
wherein, the image pattern is a plurality of referencing marks projected in a display region, and the coordinates of the location pointed at are detected using four referencing marks, which are closest to a center of a detection region photographed using a camera that is attached to the pointing input device, and
the relative coordinates are calculated based on a center of the scope of the display region.

7. The pointer control device of claim 6, wherein the reception unit receives a control signal for generating a button down event to move the mouse pointers.

8. The pointer control device of claim 7, further comprising an event generation unit generating the button down event.

9. The pointer control device of claim 6, wherein the image pattern comprises one of visible light, infrared light, or ultraviolet light.

10. A pointing input method comprising:
(a) capturing an image pattern outputted at a predetermined location of a display of a display device;
(b) sensing a scope of the display region based on the image pattern;
(c) extracting coordinates of a location pointed at in the display region based on a center of the sensed scope of the display region; and
(d) transmitting the extracted coordinates,
wherein operation (c) comprises applying the extracted coordinates to an actual size of the display region and extracting coordinates of the location pointed at in the display region of the actual size.

11. The pointing input method of claim 10, wherein operation (a) captures the image pattern which comprises one of visible light, infrared light, or ultraviolet light.

12. The pointing input method of claim 10, wherein the coordinates correspond to coordinates of a mouse pointer displayed in the display region.

13. The pointing input method of claim 10, further comprising receiving a user command for generating a button down event to move the mouse pointer.

14. The pointing input method of claim 13, further comprising transmitting a control signal in response to the user command.

15. A pointer control method comprising:
receiving relative coordinates of two or more mouse pointers displayed in a display region of a display device;
determining absolute coordinates of the mouse pointers with reference to the relative coordinates;
moving the mouse pointers using the absolute coordinates; and outputting an image pattern, based on which a scope of the display region is sensed, at a predetermined location of the display region, wherein the image pattern is a plurality of referencing marks projected in the display region, and the coordinates of the location pointed at are detected using four referencing marks, which are closest to a center of a detection region photographed using a camera that is attached to the pointing input device, and the relative coordinates are calculated based on a center of the scope of the display region.

16. The pointer control method of claim 15, further comprising receiving a control signal for generating a button down event to move the mouse pointers.

17. The pointer control method of claim 15, further comprising generating the button down event.

18. The pointer control method of claim 15, wherein the image pattern comprises one of visible light, infrared light, or ultraviolet light.

19. A pointing input system comprising:
an image pattern generation device generating an image pattern, which is outputted at a predetermined location of a display region to sense a scope of the display region of a display device; and
a pointing input device sensing the scope of the display region and extracting coordinates of a location pointed at in the display region,
wherein the pointing input device comprises
an image reception unit capturing the image pattern;
a coordinate extraction unit extracting the coordinates of the location pointed at in the display region based on a center of the sensed scope of the display region; and
a transmission unit transmitting the extracted coordinates to a pointer control device which controls a mouse pointer displayed in the display region,
wherein the coordinate extraction unit applies the extracted coordinates to an actual size of the display region and extracts coordinates of the location pointed at in the display region of the actual size.

20. The pointing input system of claim 19, wherein the image reception unit captures the image pattern which comprises one of visible light, infrared light, or ultraviolet light.

21. The pointing input system of claim 19, wherein the coordinates correspond to coordinates of the mouse pointer.

22. The pointing input system of claim 19, further comprising a button unit receiving a user command for generating a button down event to move the mouse pointer.

23. The pointing input system of claim 22, wherein the transmission unit transmits a control signal to the pointer control device in response to the user command.

24. The pointing input system of claim 19, wherein the image pattern generation device is included in a projector device receiving an image generated by the pointer control device and projecting the received image onto the display region.

25. The pointing input system of claim 19, wherein the image pattern generation device outputs the image pattern in the display region using a grid having a predetermined geometric shape.

26. A pointing input system comprising:
a pointing input device sensing a scope of a display region by capturing an image pattern outputted at a predetermined location of the display region of a display device, and extracting coordinates of a location pointed at in the display region; and
a pointer control device receiving coordinates of one or more mouse pointers from the pointing input device and controlling the mouse pointers,
wherein the pointing input device comprises
an image reception unit capturing the image pattern;
a coordinate extraction unit extracting the coordinates of the location pointed at in the display region based on a center of the sensed scope of the display region; and
a transmission unit transmitting the extracted coordinates to the pointer control device which controls the mouse pointers displayed in the display region,
wherein the coordinate extraction unit applies the extracted coordinates to an actual size of the display region and extracts coordinates of the location pointed at in the display region of the actual size.

27. The pointing input system of claim 26, wherein the image reception unit captures the image pattern which comprises one of visible light, infrared light, or ultraviolet light.

28. The pointing input system of claim 26, wherein the coordinates correspond to coordinates of the mouse pointers.

29. The pointing input system of claim 26, further comprising a button unit receiving a user command for generating a button down event to move the mouse pointers.

30. The pointing input system of claim 29, wherein the transmission unit transmits a control signal to the pointer control device in response to the user command.

31. The pointing input system of claim 26, wherein the pointer control device comprises:
a reception unit receiving relative coordinates of the mouse pointers displayed in the display region;
a coordinate determination unit determining absolute coordinates of the mouse pointers with reference to the relative coordinates; and
a pointer movement unit moving the mouse pointers using the absolute coordinates.

32. The pointing input system of claim 31, wherein the reception unit receives the control signal for generating the button down event to move the mouse pointers.

33. The pointing input system of claim 32, further comprising an event generation unit generating the button down event.

34. The pointing input system of claim 31, wherein the image pattern comprises one of visible light, infrared light, or ultraviolet light.

* * * * *

UNITED STATES PATENT AND TRADEMARK OFFICE
CERTIFICATE OF CORRECTION

PATENT NO. : 8,106,884 B2  
APPLICATION NO. : 11/711034  
DATED : January 31, 2012  
INVENTOR(S) : Dong-kyung Nam et al.

Page 1 of 1

It is certified that error appears in the above-identified patent and that said Letters Patent is hereby corrected as shown below:

Column 13, Line 28, In Claim 19, delete "comprises" and insert -- comprises: --, therefor.

Column 14, Line 14, In Claim 26, delete "comprises" and insert -- comprises: --, therefor.

Signed and Sealed this
Twenty-ninth Day of May, 2012

David J. Kappos
*Director of the United States Patent and Trademark Office*